US012532144B2

(12) United States Patent
Vilkamo et al.

(10) Patent No.: US 12,532,144 B2
(45) Date of Patent: Jan. 20, 2026

(54) APPARATUS, METHODS AND COMPUTER PROGRAMS FOR PROCESSING AUDIO SIGNALS

(71) Applicant: Nokia Technologies Oy, Espoo (FI)

(72) Inventors: Juha Tapio Vilkamo, Helsinki (FI); Mikko-Ville Laitinen, Espoo (FI); Jussi Kalevi Virolainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 115 days.

(21) Appl. No.: 18/422,189

(22) Filed: Jan. 25, 2024

(65) Prior Publication Data

US 2024/0259758 A1 Aug. 1, 2024

(30) Foreign Application Priority Data

Jan. 31, 2023 (GB) .................................. 2301365.9

(51) Int. Cl.
*H04S 7/00* (2006.01)

(52) U.S. Cl.
CPC .......... *H04S 7/304* (2013.01); *H04S 2420/01* (2013.01)

(58) Field of Classification Search
CPC .......... H04S 7/304; H04S 7/301; H04S 7/306; H04S 7/308; H04S 2400/11; H04S 2400/13; H04S 2420/01; H04S 2420/03; G06F 3/165; G10L 19/008
USPC .......................................................... 381/310
See application file for complete search history.

(56) References Cited

U.S. PATENT DOCUMENTS

2023/0020792 A1 1/2023 Tajik
2024/0305947 A1 * 9/2024 Laitinen .................. H04S 7/304

FOREIGN PATENT DOCUMENTS

EP 4164255 A1 4/2023
EP 4175326 A1 5/2023
GB 2592388 A 9/2021
GB 2611800 A 4/2023
WO WO-2022136725 A1 6/2022

OTHER PUBLICATIONS

Nokia Corporation "Description of the IVAS MASA C Reference Software" 3GPP TSG-SA4#106 Meeting, Oct. 21-25, 2019, Busan, Republic of Korea. TDoc S4-191167, pp. 1-16.

Nokia Corporation "Proposal for IVAS MASA Channel Audio Format Parameter" 3GPP TSG-SA4#103 Meeting, Apr. 8-12, 2019, Newport Beach, California. TDoc S4-190395, pp. 1-6.

* cited by examiner

*Primary Examiner* — Paul Kim
(74) *Attorney, Agent, or Firm* — McCarter & English LLP

(57) ABSTRACT

Examples of the disclosure relate to apparatus, methods and computer programs for processing spatial audio. In examples, an apparatus can be configured to receive information indicative of a first orientation and/or location of a listener and also to obtain input audio signals. The apparatus can be configured to process the input audio signals using at least the information indicative of the first orientation and/or location of the listener to generate processed audio signals and to generate spatial metadata based at least on the input audio signals. The apparatus can also be configured to enable transmission of the processed audio signals and the spatial metadata, wherein the transmitted signals and the spatial metadata are configured to enable rendering of a spatial audio output based on the processed audio signals and the spatial metadata and information indicative of a second orientation and/or location of the listener.

20 Claims, 7 Drawing Sheets

APPARATUS, METHODS AND COMPUTER PROGRAMS FOR PROCESSING AUDIO SIGNALS

TECHNOLOGICAL FIELD

Examples of the disclosure relate to apparatus, methods and computer programs for processing audio signals. Some relate to apparatus, methods and computer programs for processing audio signals for rendering of a spatial audio output.

BACKGROUND

Spatial audio enables spatial properties of a sound scene to be reproduced for a listener so that the listener can perceive the spatial properties. The spatial audio could be used for teleconferencing, mediated reality content such as augmented reality and virtual reality or for any other suitable purpose.

BRIEF SUMMARY

According to various, but not necessarily all, examples of the disclosure there is provided an apparatus comprising means for:

- receiving information indicative of a first orientation and/or location of a listener;
- obtaining one or more input audio signals;
- processing the one or more input audio signals using at least the information indicative of the first orientation and/or location of the listener to generate one or more processed audio signals;
- generating spatial metadata based at least on the one or more input audio signals; and
- enabling transmission of the one or more processed audio signals and the spatial metadata, wherein the transmitted signals and the spatial metadata are configured to enable rendering of a spatial audio output based on the processed audio signals and the spatial metadata and information indicative of a second orientation and/or location of the listener.

Processing the one or more input audio signals using at least the information indicative of the first orientation and/or location of the listener may comprise mixing the input audio signals as a function of at least one of; an angular orientation, position information associated with the one or more input audio signals.

Processing the one or more input audio signals using at least the information indicative of the first orientation and/or location of a listener may comprise rotating position information of one or more input audio signals based on the information indicative of the first orientation and/or location of the listener.

The means may be for enabling transmission of an indication that the one or more processed audio signals have been processed using the information indicative of the first orientation and/or location of a listener.

The information indicative of the first orientation and/or location of a listener may be received from a device configured to determine the orientation and/or location of the listener.

The information indicative of the first orientation and/or location of a listener may be received in response to the orientation and/or location of the listener changing from a first zone to a second zone.

The information indicative of the first orientation and/or location of a listener may be received at regular intervals and the means are for determining if the orientation and/or location of the listener has changed from a first zone to a second zone.

The means may be for determining one or more criteria of the information indicative of the first orientation and/or location of a listener and enabling the processing the one or more audio input signals using the information indicative of the first orientation and/or location of a listener based on the one or more criteria.

The information indicative of the first orientation and/or location of a listener might not be used to generate the spatial metadata.

The means may be for performing a rotation of the generated spatial metadata.

The one or more audio input signals may comprise at least one of: mono audio signals, stereo audio signals, multi-channel surround audio signals, Ambisonic audio signals, parametric spatial audio signals.

The orientation and/or location of a listener may correspond to at least one of: a real-world orientation and/or location of the listener, a virtual orientation and/or location of the listener.

The apparatus may be configured to enable transmission of the one or more processed audio signals and the spatial metadata to an audio playback device.

According to various, but not necessarily all, examples of the disclosure there is provided a device comprising an apparatus as described herein wherein the device comprises at least one of: a server device, a processing device, a cloud device.

According to various, but not necessarily all, examples of the disclosure there is provided a method comprising:

- receiving information indicative of a first orientation and/or location of a listener;
- obtaining one or more input audio signals;
- processing the one or more input audio signals using at least the information indicative of the first orientation and/or location of the listener to generate one or more processed audio signals;
- generating spatial metadata based at least on the one or more input audio signals; and
- enabling transmission of the one or more processed audio signals and the spatial metadata, wherein the transmitted signals and the spatial metadata are configured to enable rendering of a spatial audio output based on the processed audio signals and the spatial metadata and information indicative of a second orientation and/or location of the listener.

According to various, but not necessarily all, examples of the disclosure there is provided a computer program comprising instructions which, when executed by an apparatus, cause the apparatus to perform:

- receiving information indicative of a first orientation and/or location of a listener;
- obtaining one or more input audio signals;
- processing the one or more input audio signals using at least the information indicative of the first orientation and/or location of the listener to generate one or more processed audio signals;
- generating spatial metadata based at least on the one or more input audio signals; and
- enabling transmission of the one or more processed audio signals and the spatial metadata, wherein the transmitted signals and the spatial metadata are configured to enable rendering of a spatial audio output based on the processed audio signals and the spatial metadata and information indicative of a second orientation and/or location of the listener.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
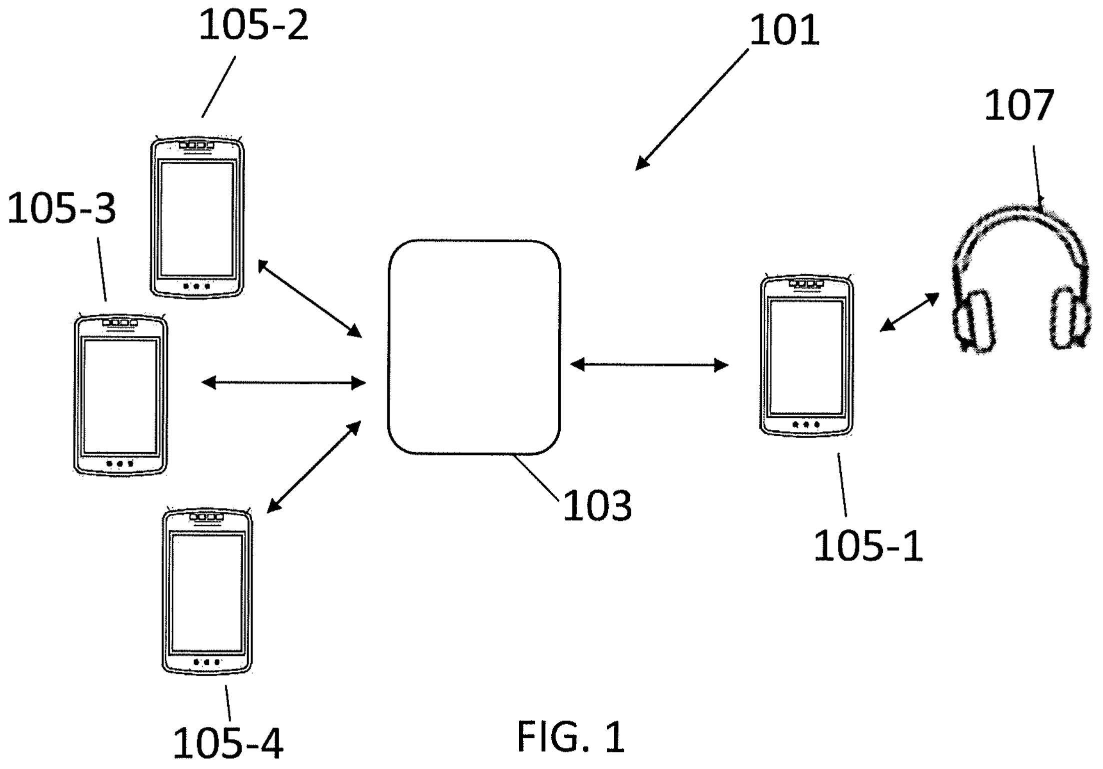
FIG. 1 shows an example system.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

Examples of the disclosure relate to apparatus, methods and computer programs for processing spatial audio. Examples of the disclosure could be used in teleconference systems such as voice conference systems, mediated reality systems, gaming applications or any other suitable spatial audio systems. The processing of the spatial audio using the examples of the disclosure can help to reduce instabilities in the spatial audio outputs and provide high quality spatial audio for the listeners.

Figure 8:
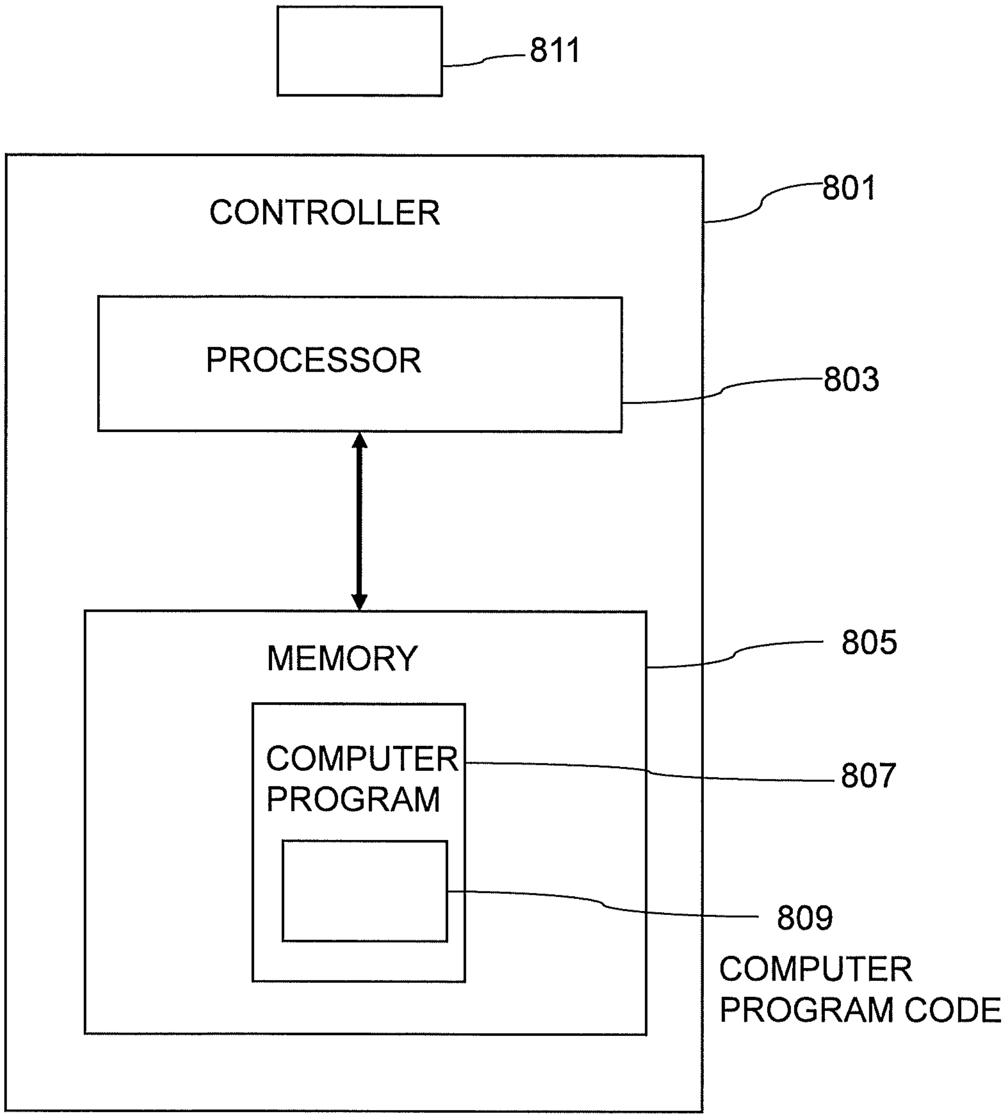
FIG. 8 shows an example apparatus.

FIG. 1 shows an example system 101 that can be used to implement examples of the disclosure. The system 101 comprises a server 103 and a plurality of listener devices 105 that are configured to communicate with the server 103. The system 101 can also comprise one or more head mounted devices 107 that can be used with one or more of the listener devices 105. The server 103 and the listener devices 105 can comprise apparatus or controllers. Examples of apparatus or controllers are shown in FIG. 8. In some examples the head mounted devices 107 could comprise an apparatus or controller as shown in FIG. 8 or any other suitable type of apparatus or controller. In some examples the head mounted devices 107 and the listener devices 105 could be integrated to form smart headphones or other similar devices.

The server 103 can enable any suitable functions for the respective listener devices 105. For example, the server 103 can enable teleconferencing functionality, gaming functionality, mediated reality applications and/or any other suitable functions. The server 103 can be configured to enable communications between the respective listener devices 105. For example, the server 103 can be configured to receive audio signals from one or more of the listener devices 105 and enable the received audio signals to be provided to the other listener devices 105 in the system 101.

The server 103 can be configured to perform processing on the received audio signals. For example, the server 103 can be configured to combine the audio signals from the plurality of listener devices 105 and enable the combined audio signals to be transmitted to the respective listener devices 105.

The server 103 can be configured to perform spatial audio processing to generate spatial metadata that can be used by the listener devices 105 to provide a spatial audio output. The signals that are sent from the server 103 back to the listener devices 105 can comprise parametric spatial audio. The parametric spatial audio signal can comprise an audio signal and corresponding spatial metadata that has been generated by the server 103.

The listener devices 105 can be any suitable type of devices. In some examples the listener devices 105 can comprise personal communications devices. In some examples the listener devices 105 can comprise mobile devices. The listener devices 105 can comprise mobile telephones or any other suitable type of listener device 105.

The listener devices 105 can be configured to capture audio signals. The listener devices 105 can comprise one or more microphones, or any other suitable means, for capturing audio signals. The audio signals that are captured by the listener devices 105 can comprise voice signals or any other suitable type of signals. For instance, the audio signals could comprise the voice part of a telephone call. The audio signals captured by the listener device 105 can be transmitted from the listener device 105 to the server 103.

In some examples the listener devices 105 can be configured to playback audio for a listener of the listener device 105. The listener devices 105 can comprise one or more speakers for playing back audio.

The listener devices 105 can also be configured to perform any appropriate processing on audio signals captured by the listener device 105 and/or on audio signals or parametric audio signals received from the server 103. The processing can be performed by an apparatus or controller as shown in FIG. 8 or by any other suitable means.

In the example of FIG. 1 four listener devices 105 are shown in the system 101. Other numbers of listener devices 105 could be comprised within the system 101 in other examples. In the example of FIG. 1 all the listener devices 105 are the same type of listener devices 105. In the example of FIG. 1 all the listener devices 105 are mobile phones. Other types of listener devices 105 could be used for some or all of the listener devices 105 in other examples.

In the example of FIG. 1 a first listener device 105-1 is coupled to a head mounted device 107. The head mounted device 107 can comprise headphones or any other suitable type of device that can be configured to be worn on the listener's head. The head mounted device 107 can comprise speakers that are configured so that, when the head mounted device 107 is worn by a listener a first speaker is positioned in or adjacent to the listener's left ear and a second speaker is positioned in or adjacent to the listener's right ear.

The listener device 105-1 can be coupled to the head mounted device 107 by any suitable communication means. In some examples the listener device 105-1 can be coupled to the head mounted device 107 by a short-range wireless communication means such as a Bluetooth connection or any other suitable means.

In FIG. 1 only one of the listener devices 105 is shown to be coupled to a head mounted device 107. However, any number of the listener devices 105 could be coupled to a head mounted device 107.

In some examples the listener devices 105 and/or the head mounted devices 107 can be configured to determine a position of the listener device 105 or of the head mounted device 107 or of a listener who is using the listener device 105. The respective position could comprise an orientation. For example, it could be the direction that the listener is facing. In some examples the position could comprise a geographical location within a coordinate system. The position could be a real-world position or could be a virtual position within a virtual or mediated reality.

The listener devices 105 and/or head mounted devices 107 can comprise any suitable sensors for determining the positions of the listener and/or of the listener devices 105 or head mounted devices 107. In some examples the head mounted device 107, or any other suitable means that is coupled to the listener device 105 can be configured to determine the position information and enable this information to be provided to the listener device 105. The sensors for determining the position could comprise one or more accelerometers, visual sensors, LiDAR sensors or any other suitable means.

Once the position of a listener has been determined by the listener device 105, or has been provided to the listener device 105, information indicative of this position can be transmitted from the listener device 105 to the server 103. The server 103 can be configured to use the information about the position of the listener device 105 to process the audio signals. The server 103 can be configured to use the position information to generate processed audio signals such that the processed audio signals can provide for improved quality spatial audio outputs for the respective listener devices 105.

Figure 2:
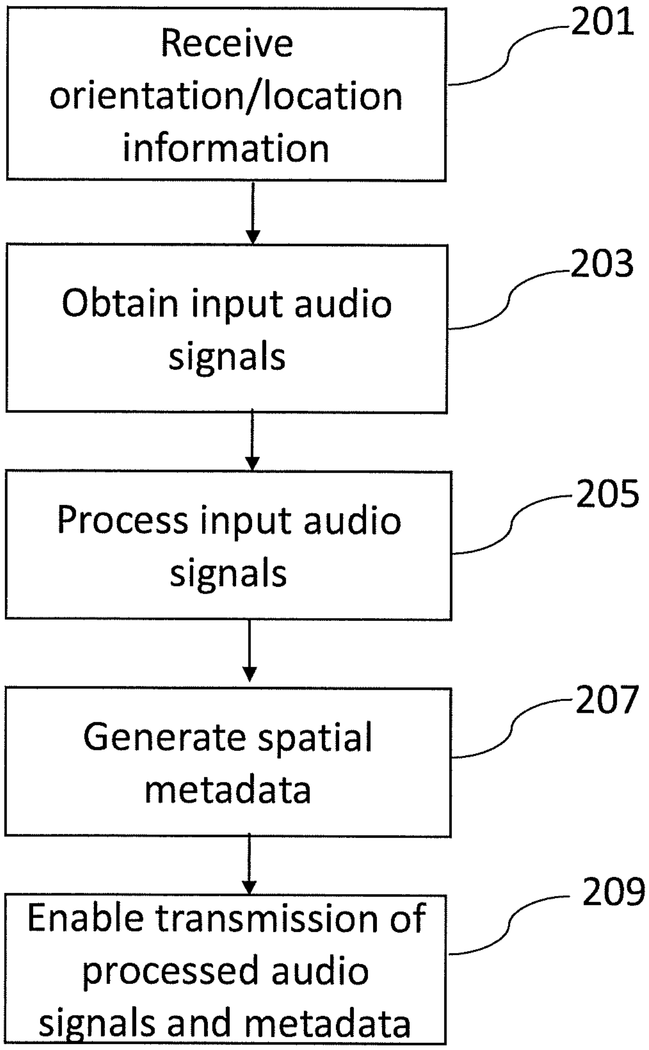
FIG. 2 shows an example method.

FIG. 2 shows an example method that can be used to implement examples of the disclosure. The method could be implemented by an apparatus or processing means within a server 103 such as the server 103 shown in FIG. 1 or could be implemented by any other suitable means such as a processing device or a cloud device.

The method comprises, at block 201, receiving information indicative of a first position of a listener. The first position could comprise an orientation and/or a location. The orientation could indicate the direction in which the listener is facing. The location could be indicated by a set of coordinates or any other suitable information.

The information that is received can comprise sufficient information to enable the orientation and/or location of the listener to be determined. The information can be provided in any suitable format. The information can be related to the orientation and/or location of the listener.

In some examples the information indicative of the position of the listener can be received from a listener device 105 or head mounted device 107 that is being used by the listener. The listener device 105 or head mounted device 107 can be configured to determine the orientation and/or location of the listener. In some examples one or more sensors in the listener device 105 or the head mounted device 107 can be used to determine the position of the listener device 105 or head mounted device 107 and the position of the listener can be determined from that information. In other examples the sensors could be configured to measure the position of the listener. The sensors could comprise visual tracking means, Lidar sensors, inertial measurement units and/or any other suitable types of sensors that can be used to enable an orientation and/or location to be determined.

In some examples the information indicative of the position of the listener can be received in response to the orientation and/or location of the listener changing from a first zone to a second zone. In some examples the zone could comprise an angular range or segment and information indicative of the orientation of the listener can be provided if the orientation has moved from a first segment or range to a second segment or range. In some examples the zone could comprise a region or area and the information indicative of the location of the listener could be provided if the location of the listener changes from a first area to a second area. The zones can be of equal sizes or can have different sizes.

In some examples the information indicative of the first orientation and/or location of a listener can be received at regular intervals. In such examples the listener device 105 or head mounted device 107 that collected the information relating to the position can be configured to obtain and transmit the information at certain time instances. Once the information indicative of the first orientation and/or location of a listener has been received by the apparatus implementing the disclosure the apparatus can determine if the orientation and/or location of the listener has changed from a first zone to a second zone.

In some examples the processing, described below, that uses the information indicative of the first orientation and/or location of a listener might only be made if the orientation and/or location of the user has changed from a first zone to a second zone. This can reduce the processing requirements while still providing improved spatial audio outputs.

In some examples the orientation and/or location of a listener corresponds to a real-world orientation and/or location of the listener. In some examples the orientation and/or location of a listener corresponds to a virtual orientation and/or location of the listener. The virtual orientation and/or location could be part of a mediated or virtual reality application or any other suitable application. In such examples the orientation and/or location of an avatar representing or otherwise associated with the listener could be determined.

The method also comprises, at block 203, obtaining one or more input audio signals. The input audio signals can be obtained from one or more listener devices 105. The input audio signals can be obtained from other listener devices 105 other than the listener device 105 or head mounted device 107 used by the listener for which the position information has been obtained. The input audio signals could be obtained from other sources instead of, or in addition to, the other listener devices 105. For example, the input audio signals could be obtained from audio files within the server 103, from a different server 103, from other types of devices, or from any other suitable source.

The input audio signals can comprise a plurality of signals with one or more channels in respective signals. In some examples the input audio signals can comprise a single channel. In some examples the input audio signals can comprise a plurality of channels.

The one or more audio input signals can comprise mono signals, stereo audio signals, multi-channel surround audio signals, Ambisonic audio signals, parametric spatial audio signals and/or any other suitable type of signals.

The method also comprises, at block 205, processing the one or more input audio signals. The information indicative of the first orientation and/or location of the listener can be used to process the audio signals. If the input audio signals are received in an encoded format then they can be decoded before they are processed.

In some examples the processing of the one or more input audio signals using the information indicative of the first orientation and/or location of the listener can comprise mixing the input audio signals as a function of an angular orientation and/or position information associated with the one or more input audio signals.

In some examples the processing of the one or more input audio signals using the information indicative of the first orientation and/or location of the listener can comprise rotating position information of one or more input audio signals based on the information indicative of the first orientation and/or location of the listener. The position information can be received or determined by a server. The position information of the one or more audio signals can comprise a direction and/or a location of for the audio input signals.

In some examples the processing of the one or more input audio signals using the information indicative of the first orientation and/or location of the listener can be performed based on one or more criteria. In such cases is the criteria are satisfied then the processing can be performed and if the criteria are not satisfied then the processing would not be performed. The criteria could comprise a delay in receiving the information indicative of the first orientation and/or location of the listener and/or any other suitable criteria. A delay in receiving the information indicative of the first orientation and/or location of the listener could indicate that the information indicative of the first orientation and/or location of the listener is not up to date and might not be valid any more. The criteria and whether or not the criteria are satisfied can be determined the apparatus that implements the method or by any other suitable means.

The method also comprises, at block 207, generating spatial metadata based at least on the one or more input audio signals. The information indicative of the first orientation and/or location of the listener is not used to generate the spatial metadata. Not using the information indicative of the first orientation and/or location of the listener to generate the spatial metadata provides the benefit that it helps to avoid latency delays. The spatial metadata can be manipulated at the listener device 105 with more recent or up to date information indicative of the first orientation and/or location of the listener. Therefore, using the information indicative of the first orientation and/or location of the listener to generate the spatial metadata typically does not bring any particular benefits. One exception to this is if the encoding scheme (between the server 103 and the listener device 105) of the spatial metadata is such that the overall spatial audio quality at low bit rates is improved when the spatial metadata is already rotated or modified at the server 103 based on the information indicative of the first orientation and/or location of the listener. In these cases the listener device 105 can account for fact that the metadata has already been rotated or modified to that amount and only does the rotation or modification difference with respect to the more recent orientation and/or location information.

In some examples a rotation can be performed on the generated spatial metadata.

At block 209 the method comprises enabling transmission of the one or more processed audio signals and spatial metadata. The transmitted signals and spatial metadata are configured to enable rendering of a spatial audio output based on the processed audio signals and the spatial metadata and information indicative of a second orientation and/or location of the listener.

The information indicative of the second orientation and/or location of the listener can be obtained at a different time to the information indicative of the first orientation and/or location of the listener. The information indicative of the first orientation and/or location of the listener can be obtained at a first time and the information indicative of the second orientation and/or location of the listener can be obtained at a second time. The second time can be after the first time so that the information indicative of the second orientation and/or location of the listener is more up to date than the information indicative of the first orientation and/or location of the listener.

The information indicative of the first orientation and/or location of the listener and the information indicative of the second orientation and/or location of the listener can be obtained using the same means. For example, the same sensors within a listener device 105 and/or a head mounted device 107 can be used to determine a position of a listener. The respective information can be obtained in the same format.

In some examples additional information can be transmitted with, or associated with, the transmitted one or more processed audio signals and spatial metadata. Such information could comprise an indication that the one or more processed audio signals have been processed using the information indicative of the first orientation and/or location of the listener. This information could be provided in any suitable format.

The one or more processed audio signals and spatial metadata can be transmitted to an audio playback device. The audio playback device could be a listener device 105 or head mounted device 107 being used by the listener for which the orientation and/or location information was obtained and/or can be transmitted to any other suitable listener devices 105 or head mounted devices 107. The listener devices 105 and/or head mounted device 107 can be configured for spatial rendering of the processed audio signals and playback of the spatial audio. The spatial audio could be played back by a listener device 105 or by a head mounted device 107.

Figure 3:
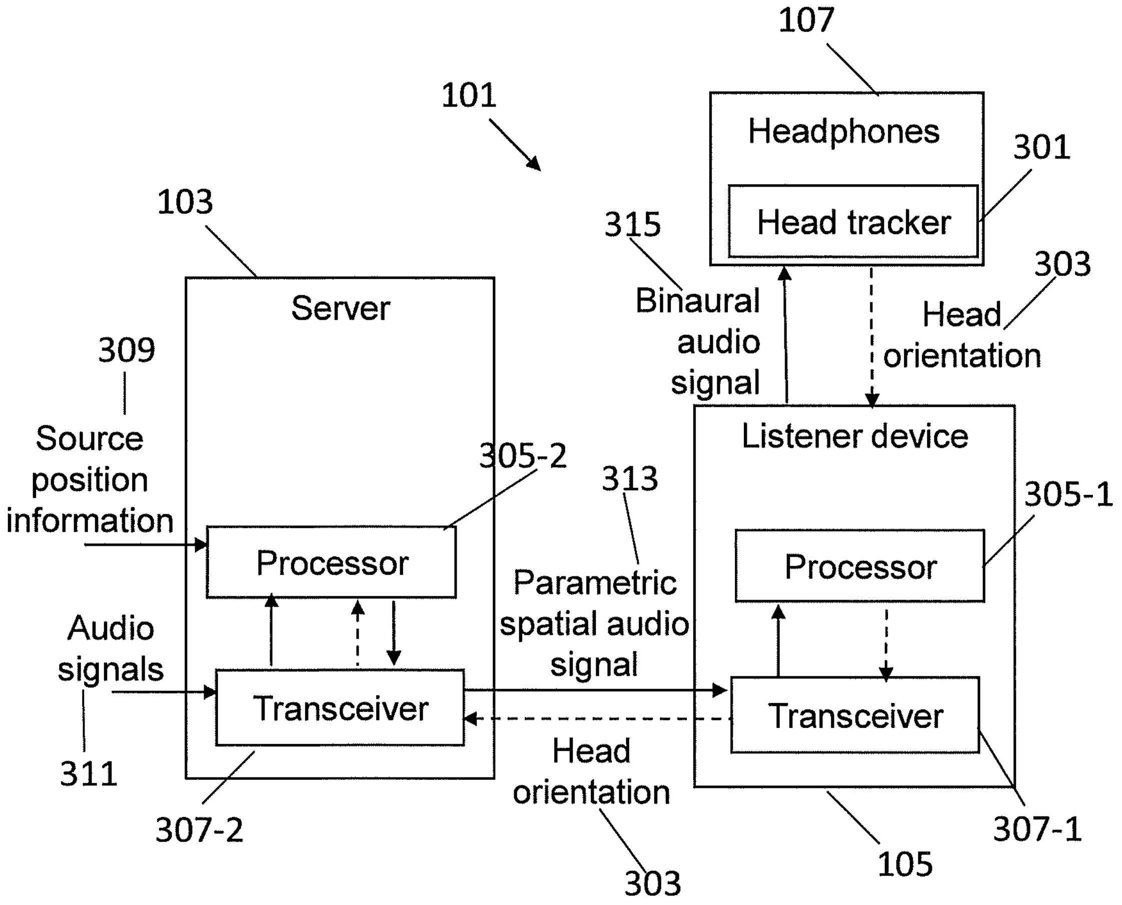
FIG. 3 shows an example operation of a system.

FIG. 3 shows an example operation of a system 101. In this example the system 101 comprises a server 103, a listener device 105 and a head mounted device 107. In this example the head mounted device 107 comprises head phones. The system 101 can also comprise other listener devices 105 that can be configured to obtain audio signals. These are not shown in FIG. 3 however similar processing can be performed for one or more of the other listener devices 105.

In FIG. 3 only the operations relevant for the rendering of audio in the listener device 105 are shown. Other operations and processing can be performed. For example, the listener device could also provide audio and/or video to the server 103 to enable the audio and/or video to be provided to listeners using other listener devices 105. This could enable a teleconferencing application or any other suitable type of application.

In the example of FIG. 3 the listener device 105 is coupled to the headphones 107. The coupling between the listener device 105 and the headphones 107 can enable the exchange of information between the listener device 105 and the headphones 107. The coupling between the listener device 105 and the headphones 107 can be a wired or wireless connection.

The head phones comprise a head tracker 301. The head tracker 301 can comprise any means that enable the orientation of the listener's head to be determined when the listener is wearing the headphones 107. The head tracker 301 could comprise an inertial measurement unit, visual tracking sensors or any other suitable means.

The headphones 107 can be configured to enable information indicative of the listener's head orientation 303 to be sent from the head tracker 301 in the headphones 107 to the listener device 105.

The information indicative of the listeners head orientation 303 can comprise any suitable information. In some examples the information indicative of the listeners head orientation 303 can comprise information that indicates the orientation of the left-right axis of listener's head orientation. In this case, the full yaw, pitch and roll information is not necessary to determine how to provide the appropriate processed audio signals. In this case only the direction of the left and right ears is needed and one of these can be inferred from another. In this case the "left-right" axis information could be direction information indicating the direction of the left or right ear of the listener.

The information indicative of the listeners head orientation 303 need not be an actual orientation of a listener's head. For example, it could be a virtual orientation or the orientation of a player avatar that represents the lister in a game or other virtual environment.

In some examples the listener device 105 can also have separate orientation/position tracking sensors that can be configured to detect the orientation and/or location of the head mounted device 107 relative to the listener device 105.

The listener device 105 comprises a processor 305-1 and a transceiver 307-1. The listener device 105 can also comprise components that are not shown in FIG. 3 The processor 305-1 could be configured to render spatial audio. The processor 305-1 could be as shown in FIG. 8 and described below or could comprise any other suitable type of processor.

The processor can be configured to process the information indicative of the listeners head orientation 303 into a format so that it can be sent from the listener device 105 to the server 103. This enables information indicative of the listeners head orientation 303 to be transmitted by the transceiver 307-1 to the server 103. The information indicative of the listeners head orientation 303 can be transmitted from the listener device 105 to the server 103 via any suitable means. In some examples a control channel between the listener device and the server 103 could be used. In some examples a separate feedback channel could be set up for the purpose of transmitting the information indicative of the listeners head orientation 303 from the listener device 105 to the server 103. In some examples the information indicative of the listeners head orientation 303 can be embedded in audio signals and/or any other suitable type of associated signal.

In some examples, the information indicative of the listeners head orientation 303 can be sent from the listener device 105 to the server 103 only when listener's head orientation has moved from one predefined sector to another sector. For example, there can be four sectors defined with following azimuth boundaries represented in degrees: −45-+45, +45-+135, +135-−135, −135-−45. If the azimuth value of the listener's head orientation stays within the same sector (e.g., between +-45 degrees), the orientation value describing the center of sector (0 degrees) gets sent only once. A new orientation feedback value won't be sent until the listener's head orientation exceeds the sector's boundary and moves to another sector. If the listener keeps turning their head to the orientation value of 46 degrees, the orientation has moved to the second sector and a new orientation feedback value of +90 degrees (the center direction of the second sector) would be sent to the server 103. In this example four sectors with a ninety degree range are used. In other examples more sectors could be used, and the sectors could be have different sizes. The use of the sectors to control the sending of the information indicative of the listeners head orientation 303 can be used to optimize, or substantially optimize, the bitrate of the data being transmitted between the listener device 105 and the server 103.

In other examples the information indicative of the listeners head orientation 303 can be sent from the listener device 105 to the server 103 instantly (for example several times each second) or at regular intervals. In such cases the server 103 can be configured to track which sector the listeners orientation or location falls within and can make appropriate updates if the sector has changed. In some examples the information indicative of the listeners head orientation 303 can be provided without any indication of sectors. For instance, the information could just be an orientation value.

The server 103 comprises a processor 305-2 and a transceiver 307-2. The server 103 can also comprise components that are not shown in FIG. 3. The processor 305-2 could be configured to process input audio signals. The processor 305-2 could be as shown in FIG. 8 and described below or could comprise any other suitable type of processor.

The transceiver 307-2 of the server 103 receives the information indicative of the listeners head orientation 303 from the listener device 105. The transceiver 307-2 of the server 103 can also input audio signals 311. The input audio signals 311 can be received from the other listener devices 105 that are not shown in FIG. 3 and/or from any other suitable source.

The input audio signals 311 could comprise mono audio signals, stereo audio signals, multi-channel surround audio signals, Ambisonic audio signals, parametric spatial audio signals or any other suitable type of signals. The input audio signals 311 could be encoded using any suitable protocol such as Advanced Audio Coding (AAC) or Enhanced Voice Services (EVS). The input audio signals 311 could comprise speech from the listeners or users of other listener devices 105 or any other suitable type of content.

The processor 305-2 of the server 103 can receive the head orientation 303 and the input audio signals 311 as inputs. The processor 305-1 of the server 103 can also be configured to receive source position information 309 as an input. The source position information 309 defines how the input audio signals 311 should be positioned in space for rendering to the listener of the listener device 105. The source position information 309 could be determined by the server 103 based on information from the listener devices 105 or could be received from an external source. In some examples the source position information could be generated by the server 103.

The processor 305-2 of the server 103 can then process the input audio signals 311 using the information indicative of the listeners head orientation 303 to generate processed audio signals. Any other suitable information such as the source position information 309 can also be used to process the input audio signals 311. The processor 305-2 can also be configured to generate spatial metadata. The spatial metadata can be generated based on the input audio signals and any other suitable information.

The processor 305-2 then provides the processed audio signals and the generated spatial metadata to the transceiver 307-2 of the server 103. The processed audio signals and the generated spatial metadata can be provided as a parametric spatial audio signal 313. The parametric spatial audio signal 313 can be transmitted from the server 103 to the listener device 105. The respective signals can be encoded and decoded as appropriate.

The parametric spatial audio signal 313 is received by the transceiver 307-1 of the listener device 105 and provided from the transceiver 307-1 to the processor 305-1 of the listener device 105. The processor 305-1 renders a spatial output based on the parametric spatial audio signal 313 and also a second head orientation of the listener. The second head orientation of the listener is a more current or up to date head orientation. The information indicative of the second head orientation of the listener is obtained at a later point in time than the information indicative of the first head orientation.

In this example the playback device being used by the listener is the headphones 107. In this case the processor 305-1 of the listener device 105 processes the received parametric spatial audio signal 313 to a binaural audio signal 315. Other types of spatial audio output could be provided in other examples.

The binaural audio signal 315 is provided from the listener device 105 to the headphones 107 via the wired or wireless connection. The headphones 107 then playback the binaural audio signal 315 to the listener.

In the example of FIG. 3 the headphones 107 are configured to determine the orientation of the listener's head. In some examples information indicative of the listeners location could be obtained in addition to the orientation information or instead of the orientation information. The information indicative of the listeners location could be obtained by the headphones 107, the listener device 105 or by any other suitable means and sent to the server 103. In such cases the information relating to the listeners location could be used instead of, or in addition to, the information indicative of the listeners head orientation 303.

In the example of FIG. 3 the headphones 107 and the listener device 105 are shown as separate devices. In other examples they could be integrated into the same device. Appropriate adjustments to the system 101 of FIG. 3 would be made in such cases.

Figure 4:
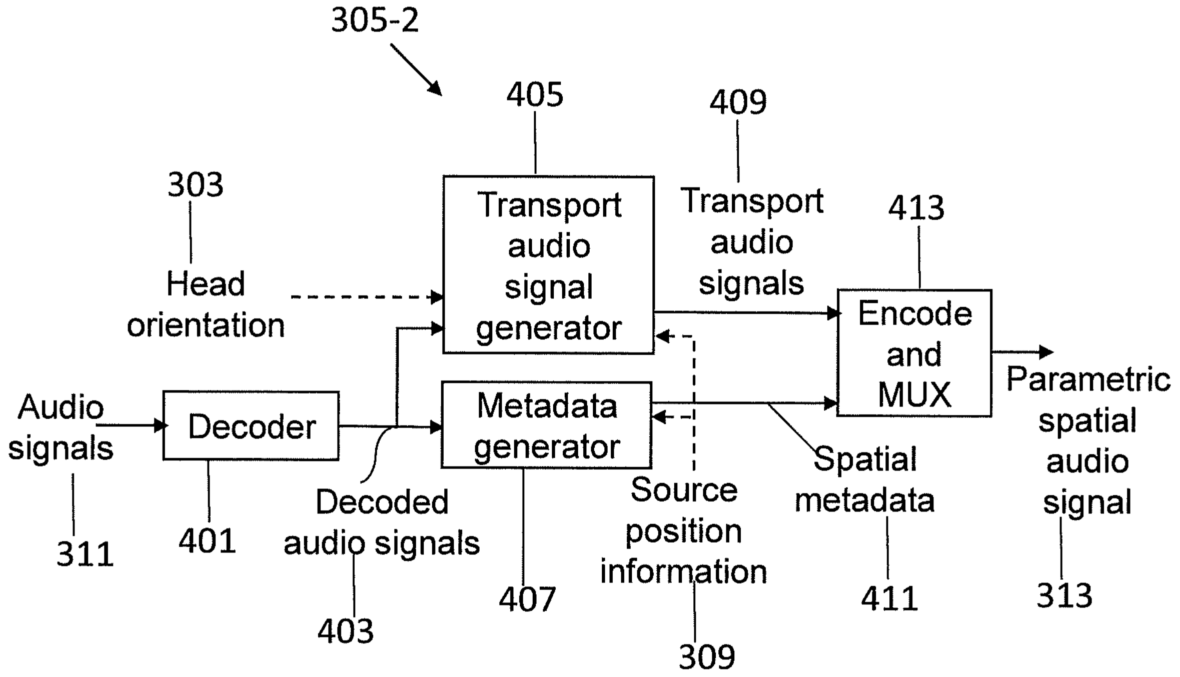
FIG. 4 shows an example operation of a processor.

FIG. 4 shows an example operation of a processor 305-2 of a server 103. FIG. 4 shows operations that are related to the processing of the input audio signals 311 using information indicative of a head orientation 303 of a listener. The operations shown in FIG. 4 relates to the generation of a parametric spatial audio signal for a listener device 105 such as the listener device 105 shown in FIG. 3. Similar processes and operation could be implemented to provide a corresponding parametric spatial audio signal for one or more of the other listener devices 105 in the system.

The input audio signal 311 are received as an input to the processor 305-2. The input audio signals 311 can be received from the other listener devices 105 that are not shown in FIG. 3 and/or from any other suitable source.

The input audio signals 311 could comprise mono audio signals, stereo audio signals, multi-channel surround audio signals, Ambisonic audio signals, parametric spatial audio signals or any other suitable type of signals. The input audio signals 311 could be encoded using any suitable protocol such as Advanced Audio Coding (AAC) or Enhanced Voice Services (EVS). The input audio signals 311 could comprise speech from the listeners or users of other listener devices 105 or any other suitable type of content.

The input audio signals 311 are provided as an input to a decoder 401. The decoder 401 is configured to decode the input audio signals 311 in dependence upon their encoding format. For example, if the audio signals 311 have been encoded using EVS then the decoder 401 would be an EVS decoder.

The decoder 401 can be configured to decode the input audio signals 311 into a format that is suitable for processing. For example, the decoder 401 can be configured to decode the input audio signals 311 into a Pulse Code Modulation (PCM) format, or any other suitable format.

The decoder 401 provides decoded audio signals 403 as an output. The processor is configured so that the decoded audio signals 403 are provided to a transport audio signal generator 405 and also a metadata generator 407. If the input audio signals 311 comprise metadata or other information then these can also be decoded and provided with the decoded audio signals 403.

The transport audio signal generator 405 is configured to receive the decoded audio signals 403, the information indicative of the listener head orientation 303 and the source position information 309 as inputs. The information indicative of the listener head orientation 303 can be received from headphones 107 or from any other suitable source.

In this example information indicative of the listener head orientation 303 is used. In some examples information indicative of the location of the listener could be used instead of, or in addition to the information indicative of the head orientation 303. The source position information 309 could be determined by the server 103 based on information from the listener devices 105 or could be received from an external source.

The transport audio signal generator 405 is configured to process the decoded audio signals 403, the information indicative of the listener head orientation 303 and the source position information 309 to generate transport audio signals. Any suitable type of process can be used by the transport audio signal generator 405. An illustrative example is as follows.

The decoded audio signals 403 are denoted as $s_d(t)$ where t is time and subscript d=1, . . . , D is the index of the other listener device 105 from which the audio signal originates, and D is the number of other listener devices 105. In this example it is assumed that the input audio signals 311 are mono signals.

The source position information 309 is denoted as $\theta_d(n)$ which is an azimuth angle at the horizontal plane and where n is a temporal index. The temporal index n refers to the temporal resolution in which the information indicative of the head orientation 303 and the source position information 309 are received. For notational simplicity, in this example the same temporal resolution is used for the spatial metadata generated as described below. In some examples, different temporal resolutions could be used for one or more of these. In this example the temporal index n refers to a frame of audio data, whereas the time index t refers to a sample of a PCM audio signal, having a high temporal resolution.

The information indicative of the head orientation 303 can be received in any suitable format such as a rotation matrix that represents the rotation to be performed on direction vectors to compensate for the head rotation. If the information indicative of the head orientation 303 is provided as yaw, pitch, roll, it can be converted to a rotation matrix R(n), where n is the temporal index and angles are given as radians, by $$c_1 = \cos(-\text{roll})$$
$$c_2 = \cos(-\text{pitch})$$
$$c_3 = \cos(-\text{yaw})$$
$$s_1 = \sin(-\text{roll})$$
$$s_2 = \sin(\text{pitch})$$
$$s_3 = \sin(-\text{yaw})$$

$$R(n) = \begin{bmatrix} c_2c_3 & -c_2s_3 & s_2 \\ c_1s_3 + c_3s_1s_2 & c_1c_3 - s_1s_2s_3 & -c_2s_1 \\ s_1s_3 - c_1c_3s_2 & c_3s_1 + c_1s_2s_3 & c_1c_2 \end{bmatrix}$$

It should be noted that signs and orders of angles are simply a convention based on decided rotation axes and orders of rotations. Other equivalent conversions can be similarly created. In addition, rotation matrices can be obtained from quaternions or direction cosine matrices that also are used in representing tracked orientation.

To generate the transport audio signal the source position information 309 is converted to a vector form. The following equation can be used to convert the source position information 309 to a vector form.

$$v_d(n) = \begin{bmatrix} \cos(\theta_d(n)) \\ \sin(\theta_d(n)) \\ 0 \end{bmatrix}$$

The vector form of the source position information 309 is can then be rotated by the rotation matrix from the information indicative of the head orientation 303.

$$v_{d,R}(n) = \begin{bmatrix} v_{d,R,x}(k, n) \\ v_{d,R,y}(k, n) \\ v_{d,R,z}(k, n) \end{bmatrix} = R(n)v_d(n)$$

Then, the rotated azimuth and elevation can be determined by $$\theta_{d,R}(n) = \operatorname{atan2}(v_{d,R,y}(n), v_{d,R,x}(n))$$
$$\varphi_{d,R}(n) = \operatorname{atan2}\left(v_{d,R,z}(n), \sqrt{(v_{d,R,x}(n))^2 + (v_{d,R,y}(n))^2}\right)$$

The transport audio signals 409 can then be generated from the rotated directions. In some examples the transport audio signals 409 can be generated using a panning rule such as $$s_t(t) = \sum_{d=1}^{D} p_d(n)s_d(t)$$

Where $s_t(t)$ denotes the transport audio signals 409 in a vector form in which the row indicates the left or right channel in this order, and where $p_d(n)$ denotes the panning gains. The panning gains $p_d(n)$ can be:

$$p_d(n) = \begin{bmatrix} \sqrt{0.5v_{d,y}(n) + 0.5} \\ \sqrt{-0.5v_{d,y}(n) + 0.5} \end{bmatrix}$$

This approach generates transport audio signals 409 having some similarity to cardioid patterns towards left and right directions. Other approaches to generate the transport audio signals 409 could be used in other examples. For instance, in some examples the transport audio signals can be generated from the rotated azimuth $\theta_{d,R}(n)$ and elevation $\varphi_{d,R}(n)$, or from the corresponding vector form $v_{d,R}(n)$. For instance, the transport audio signals 409 could be obtained from the input audio signals $s_d(t)$ processed with head-related impulse responses (HRIRs) according to the azimuth $\theta_{d,R}(n)$ and elevation $\varphi_{d,R}(n)$. In some examples, these HRIRs can be simplified so that any overall spectral effects are omitted but the inter-aural phase and level differences are preserved.

In the above formula the temporal step of updating the panning gains $p_d(n)$ is sparser (that is, every time index n) than the temporal resolution of the signals (that is, time index t). When the panning gains are updated, they are typically not updated instantaneously, because such discontinuities cause audible artifacts in the generated transport audio signals 409. Instead, the panning gains can be interpolated smoothly from the gains $p_d(n-1)$ to the gains $p_d(n)$, during several samples of t. For instance, the interpolation length can correspond to the length of the frame n, or a part of it.

The transport audio signals 409 are then provided from the transport audio signal generator 405 to an encoder and MUX module 413.

The metadata generator 407 is also configured to receive the decoded audio signals 403 and the source position information 309 as inputs. In this example the metadata generator 407 does not need to receive the information indicative of the listeners head orientation 303 as an input. The information indicative of the listeners head orientation 303 is not used to generate the spatial metadata. The head orientation can be accounted for with updated head orientation information in the listener device 105. This can avoid lags in the spatial metadata caused by the transmission delays between the listener device 105 and the server 103 which would lead to poor tracking of the spatial audio with a listener's head movement. Furthermore, the spatial metadata can be adjusted at the listener device 105 and so there is little benefit to making adjustments at the server 103, apart from some situations such as when the adjustment at the server is beneficial for the encoding scheme that is used to encode the spatial metadata.

Any suitable means or process can be used to generate the spatial metadata. In some examples the spatial metadata can be generated as follows.

The energy of the decoded audio signals 403 $s_d(t)$ can be determined in frequency bands. Any suitable transform such as short-time Fourier transform (STFT) can be used to perform the time-frequency transform. The transformed audio signals can be defined as $S_d(b, n)$, where b is the frequency bin index of the STFT. The energy of band k is determined by $$E_d(k, n) = \sum_{b_{low}(k)}^{b_{high}(k)} |S_d(b, n)|^2$$

where $b_{low}(k)$ and $b_{high}(k)$ are the lowest and highest frequencies of a frequency band k that combines multiple bins. The frequency resolution k can be selected such that is relevant for spatial hearing. For example, 24 frequency bands following the Bark frequency resolution could be used. The frequency resolution for determining the spatial metadata can be selected such that for higher frequencies respective bands k contain an increasing number of frequency bins b.

The spatial metadata can then be determined using the same direction vectors $v_d(n)$ that were determined in the transport audio signal generator 405. A vector sum of the direction vectors weighted by the corresponding energies can be computed by $$v_{sum}(k,n)=\begin{bmatrix} v_{sum,x}(k,n) \\ v_{sum,y}(k,n) \\ v_{sum,z}(k,n) \end{bmatrix}=\sum_{d=1}^{D} v_d(n)E_d(k,n)$$

A sum energy can be determined by $$E_{sum}(k,n)=\sum_{d=1}^{D} E_d(k,n)$$

The azimuth and the elevation angles can be determined by $$\theta(k,n)=\text{atan2}(v_{sum,y}(k,n),\ v_{sum,x}(n))$$

$$\varphi(k,n)=\text{atan2}\left(v_{sum,z}(n),\ \sqrt{(v_{sum,x}(n))^2+(v_{sum,y}(n))^2}\right)$$

A direct-to-total energy ratio is determined by $$r(k,n)=\frac{|v_{sum}(k,n)|}{E_{sum}(k,n)}$$

The azimuth θ(k, n), elevation φ(k, n) and direct-to-total energy ratio r(k, n) then are the Spatial metadata 411 that is output by the metadata generator 407. In some examples other metadata parameters, such as coherences, can be determined. In some examples, there can be more than one direction parameter and associated ratio parameter determined for each (k,n), for example, by determining the direction corresponding to the largest energy $E_d(k, n)$ as the first direction, and formulating the second direction from based on the remaining data following the principles in the foregoing.

The spatial metadata 411 is provided from the metadata generator 407 to the encoder and MUX module 413.

The encoder and MUX module 413 receives the transport audio signals 409 and the spatial metadata 411 and encodes them. The encoding can be any suitable type of encoding. For example, the respective inputs could be encoded according to the IVAS (Immersive Voice and Audio Services) codec, or any other type of encoding to enable the audio and the metadata to be conveyed in a bit-efficient manner.

The encoded audio and metadata are multiplexed to provide a parametric spatial audio signal 313. The parametric spatial audio signal 313 is the output of the encode and MUX module 413 and the output of the processor 305-2 of the server 103.

Variations to the examples described above could be used in some examples of the disclosure. For instance, in some examples the input audio signals 311 received by the server 103 could be mono audio signals. Other types of input audio signals 311 could be used in other examples. The other types of input audio signals 311 could comprise mono/object audio signals, stereo audio signals, multi-channel surround audio signals, Ambisonic audio signals, parametric spatial audio stream and/or any other suitable types of signal. The server 103 can be configured to combine the received input audio signals 311 to a single parametric spatial audio signal 313 to be provided for rendering at a listener device 105.

To combine received input audio signals 311 the server 103 can be configured to define, or receive information indicative of, directions for respective input audio signals 311. For example, if the input audio signals comprise a plurality of mono audio signals then respective mono audio signals can be defined to a respective direction. Other types of input audio signals 311 can be defined to a sector or a set of directions. For instance, stereo and multi-channel sounds can be considered as two or more audio objects which are placed to a set of directions according to their defined sector. These signals could then be processed based on the received information indicative of the listeners head orientation 303. The processing would provide a parametric spatial audio signal 313 (comprising transport audio signals 409 and spatial metadata 411), combining all received objects, stereo signals, and multi-channel signals.

The audio input signals 311 can be other types of signals than mono audio input signals. For instance, they could be Ambisonics signals, determined from a microphone pair or from a microphone array. In examples where the input audio signals 311 comprise Ambisonics signals the Ambisonics signals can be converted to parametric spatial audio streams using methods such as Directional Audio Coding (DirAC). DirAC methods can be used to determine the spatial metadata. The transport audio signals can be determined as cardioids signals pointing towards left and right directions.

The input parametric spatial audio signals can be modified so that they span a defined sector. For instance, the server 103 can determine the sector for each input parametric spatial audio signal (and/or Ambisonic signal). The server 103 is configured to generate the spatial metadata 411 and the transport audio signals 409 such that the input parametric spatial audio signal is perceived to originate from that sector, when these signals are rendered to a spatial audio output 315 in the listener device 105. In the generation of the transport audio signals 409 the transport audio signals of the input parametric spatial audio signals are modified based on the information indicative of the listener's head orientation 303. The server 103 can be configured to flip the left and right transport audio signals of the input parametric spatial audio signals in case the user head orientation is towards the rear direction.

The server 103 can also be configured to combine a plurality of input parametric spatial audio signals into a single parametric spatial audio signal 313. The plurality of input parametric spatial audio signals can be created from objects, stereo signals and multi-channel signals; created and modified from the Ambisonic signals; received parametric spatial audio signals or from any other source. Any suitable methods or means can be used to combine the input parametric audio signals to the parametric spatial audio signal 313.

For example, similarly as in the foregoing examples of combining audio objects (mono input signals), the direction data of the input parametric spatial audio signals can also be considered as vectors, and combined in a similar fashion to form the spatial metadata 411. As a difference, the weighted vectors are not only weighted on the measured signal energy, but also based on the direct-to-total energy ratio parameter of the input parametric spatial audio signal. Otherwise the processing may be substantially the same as in the foregoing. Furthermore, one or more input parametric spatial audio signals and one or more input mono audio signals with associated direction parameters may be combined in the same vector sum operation to determine the spatial metadata 411.

In more detail, at the metadata generator 407 the spatial metadata can be formulated by modifying the aforementioned formulas by $$v_{sum}(k,n) = \begin{bmatrix} v_{sum,x}(k,n) \\ v_{sum,y}(k,n) \\ v_{sum,z}(k,n) \end{bmatrix} = \sum_{d=1}^{D} v_d(n)E_d(k,n) + \sum_{u=1}^{U} v_u(k,n)r_u(k,n)E_u(k,n)$$

where u=1 . . . U is the index of the input parametric spatial audio signal, U is the number of input parametric spatial audio signals (the respective parametric spatial audio signals can have one or more channels), $E_u(k, n)$ is the mean energy per channel of the audio signals within the parametric spatial audio signal, $v_u(k, n)$ is a unit vector pointing towards the input parametric spatial audio metadata direction information, and $r_u(k, n)$ is the direct-to-total energy ratio parameter. It is assumed that there are two transport audio signals at each of the input parametric spatial audio signals. The energy $E_u(k, n)$ is formulated the same way as $E_d(k, n)$ but based on the audio signals of the parametric spatial audio signal and taking the mean of the estimated energies per channel.

A sum energy can be determined by $$E_{sum}(k,n) = \sum_{d=1}^{D} E_d(k,n) + \sum_{u=1}^{U} E_u(k,n)$$

Otherwise, the spatial metadata can be determined as in the foregoing.

Similarly, at the transport audio signal generator 405 the transport signals may be generated by modified the above formulas by $$s_t(t) = \sum_{d=1}^{D} p_d(n)s_d(t) + \sum_{u=1}^{U} F(R(n))s_u(t)$$

where $s_u(t)$ is a vector having the left and right audio channels of the with input parametric spatial audio signal, and F(R(n)) is a matrix that is either $$\begin{bmatrix} 1 & 0 \\ 0 & 1 \end{bmatrix} \text{ or } \begin{bmatrix} 0 & 1 \\ 1 & 0 \end{bmatrix},$$

where the latter is when the user is facing rear directions (i.e., a vector indicating the direction of the left ear is closer to the right direction than left, based on R(n)). There can be thresholds and interpolations when switching matrix F(R(n)) between these modes. There can be other means to mix the audio signals within the input parametric audio signals to the provided transport audio signals.

In the example of FIG. 4 the server 103 is configured to process the input audio signals 311 in a PCM domain. Other domains could be used in other examples. For instance, if the input audio signals 311 are received in a modified discrete cosine transform (MDCT) format, then the server 103 can be configured to perform the processing of the input audio signals 311 the MDCT domain. This approach is favorable because it avoids an inverse and forward MDCT at the server 103, and so results in a lower latency.

In some examples the server 103 can be configured to perform rotation of the metadata 411. For example, the metadata quantization and encoding scheme can be such that it is best if the metadata 411 is already rotated so that it is approximately appropriate for the current head orientation. In such cases, if the server 103 has rotated the metadata 411 by a certain amount, then the listener device 105 does not need to perform the same rotation, but only the rotation difference between the rotation taken place at the server 103 and that according to the more recent head orientation.

Figure 5:
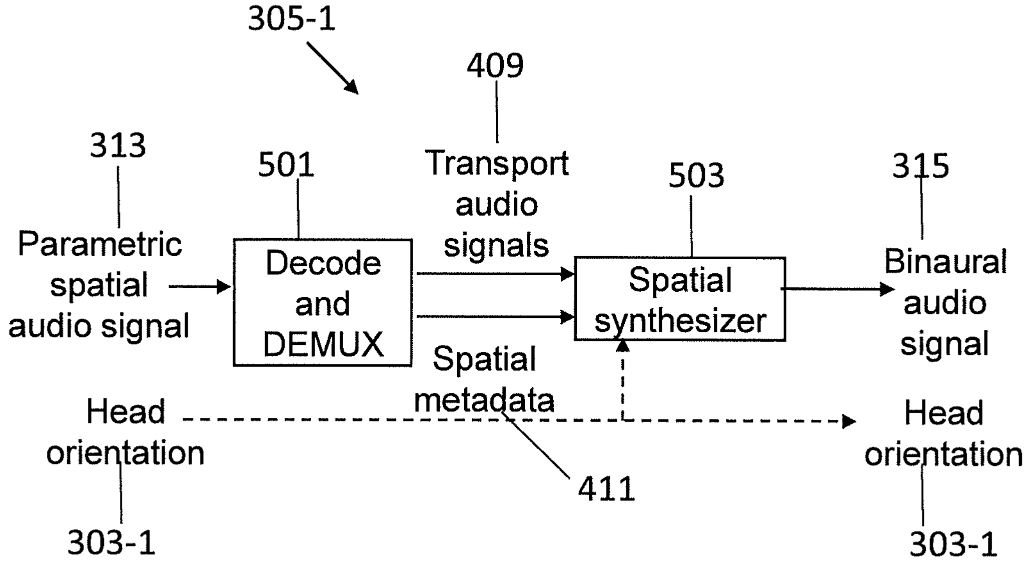
FIG. 5 shows an example operation of a processor of a listener device.

FIG. 5 shows an example operation of a processor 305-1 of a listener device 105. Similar processes and operations can be performed in respective listener devices 105 within the systems 101 implementing examples of the disclosure.

The processor 305-1 receives the parametric spatial audio signal 313 as an input. The parametric spatial audio signal 313 can comprise the processed audio signals from the server 103. The parametric spatial audio signal 313 can be generated using the processes and operations of FIG. 4 and/or by using any other suitable processes and operations.

The parametric spatial audio signal 313 is provided as an input to a decoder and DEMUX module 501. The decoder and DEMUX module 501 is configured to de-multiplex and decode the received parametric spatial audio signal 313. The decoding and demultiplexing that is applied to the parametric spatial audio signal 313 can be selected based on the type of encoding and multiplexing that has been applied to the parametric spatial audio signal 313 by the server 103.

The decoder and DEMUX module 501 provides decoded transport audio signals 409 and spatial metadata 411 as an output. The transport audio signals 409 and the spatial metadata 411 are provided to a spatial synthesizer 503. The decoded transport audio signals 409 and spatial metadata 411 can differ to the transport audio signals 409 generated by the transport audio signal generator 405 of the server and the spatial metadata 411 generated by the metadata generator 407 of the server 103. These differences can be caused by the encoding and decoding processes. However, the information content will be the same or substantially the same and their purposes are the same. Therefore, the same terms and reference numerals are used for these signals and metadata in both the server 103 and the listener device 105.

The processor 305-1 can also receive other information as inputs. The other information could comprise information indicative of the listeners head orientation 303-1. This could be received from any suitable source. For example, the headphones 107 could provide up to date information indicative of the listeners head orientation 303-1. This could be obtained at a later point in time than the information indicative of the listeners head orientation 303 that was used by the server 103 to process the input audio signals 311. The information indicative of the listeners head orientation 303-1 that is used by the listener device is therefore given the reference numeral 303-1 to indicate that it is relates to a head orientation from a later point in time.

Figure 6:
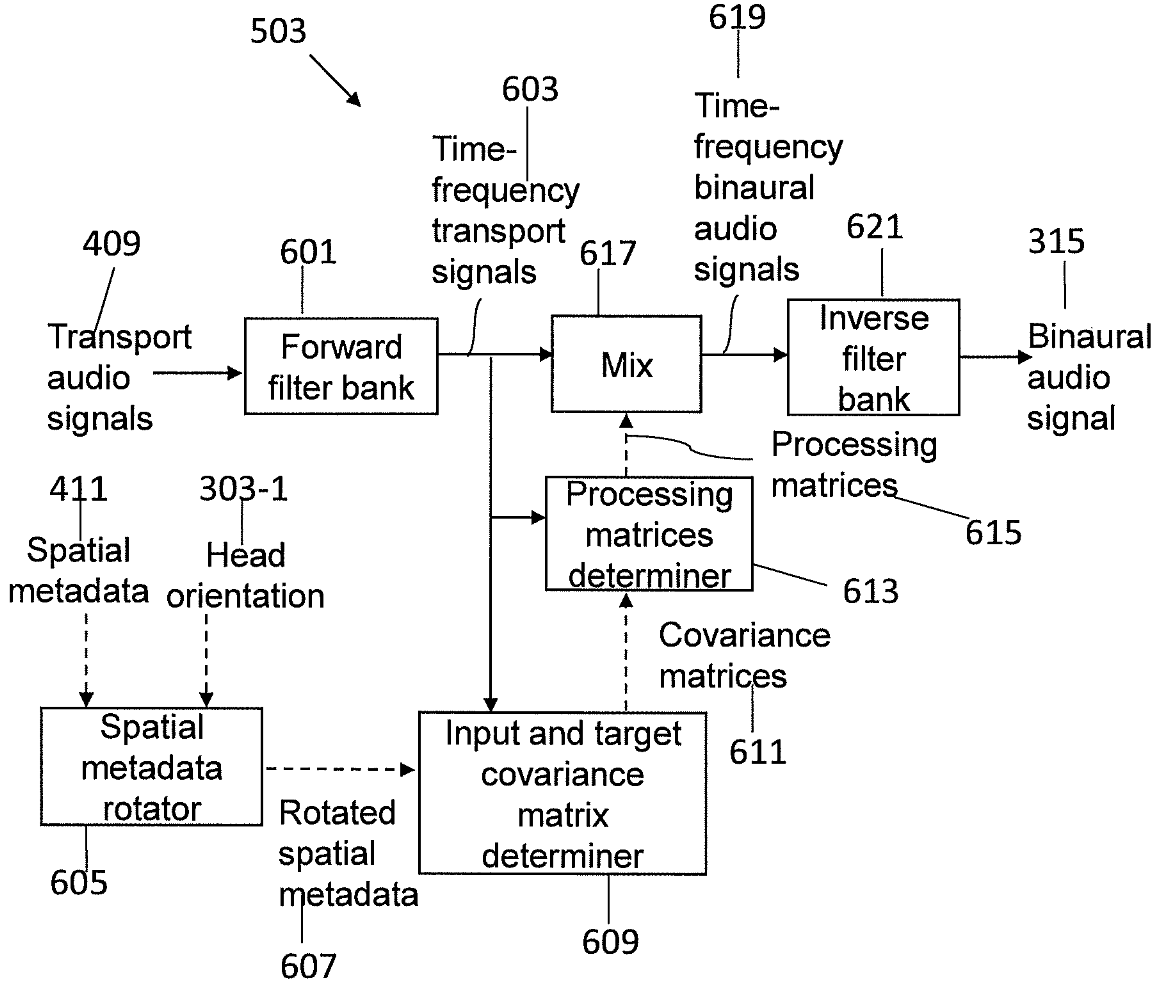
FIG. 6 shows an example spatial synthesizer.

The spatial synthesizer 503 receives the information indicative of the listeners head orientation 303-1, the transport audio signals 409, and the spatial metadata 411 as inputs. Details of the processes an operations that can be performed by the spatial synthesizer 503 are shown in FIG. 6. The spatial synthesizer 503 provides a spatial audio signal as an output. In this example the spatial audio signal is a binaural audio signal 315. Other types of spatial audio signal could be provided in other examples.

The binaural audio signal 315 is provided to the headphones 107 so that the binaural audio signal 315 can be played back to the listener. Other types of playback device could be used in other examples.

The processor 305-1 of the listener device 105 can also be configured to provide other outputs. For instance, the processor 305-1 can be configured to provide information indicative of the listeners head orientation 303 and enable this to be transmitted to the server 103.

In some examples the server 103 can provide information to the listener device 105 to indicate if the transport audio signals 409 have been rotated according to the disclosure or not. If the listener device 105 receives information indicating that the transport audio signals 409 have been rotated then the processes shown in FIG. 5 can be used. If the listener device 105 receives information indicating that the transport audio signals 409 have not been rotated, it the listener device 105 can render the parametric spatial audio signal 313 differently to the implementations of the disclosure. For example, the listener device 105 could replace the left and right transport audio signals with each other before the parametric rendering if the listener is viewing the rear directions.

FIG. 6 shows an example spatial synthesizer 503 that could be used in some examples of the disclosure. The spatial synthesizer 503 receives the information indicative of the listeners head orientation 303-1, the transport audio signals 409, and the spatial metadata 411 as inputs.

The transport audio signals 409 can be denoted $s_t(t)$. The transport audio signals 409 are provided to a Forward filter bank 601. The filter bank 601 is configured to transform the transport audio signals to a time-frequency representation. Any filter bank suitable for audio processing can be used in the forward filter bank 601. For example, the forward filter bank 601 could use the complex-modulated quadrature mirror filter (QMF) bank, a low-delay variant of a QMF bank, the short-time Fourier transform (STFT), or any other suitable filter bank. In the example of FIG. 6 an STFT is used.

The STFT can be performed as follows. First, the present frame n audio data, which could contain for example 960 samples t is concatenated with the previous 960 samples (that is, of frame n−1). Then, a square root of the Hann window is applied to the resulting sequence of 1920 samples. The result is processed with a fast Fourier transform (FFT). The result is 961 unique frequency bins, from the DC frequency to the Nyquist frequency.

The forward filter bank 601 provides time-frequency transport audio signals 603 as an output. In examples where an STFT is used the time-frequency transport audio signals 603 can be denoted in a column vector form as $S_t(b, n)$, where the row indicates the left or right transport channel as in $s_t(t)$.

The spatial synthesizer 503 is configured so that the time-frequency transport audio signals 603 are provided as an input to a mix module 617, a processing matrices determiner 613 and an input and target covariance matrix determiner 609.

The spatial metadata 411 and the information indicative of the listeners head orientation 303-1 are provided as inputs to a spatial metadata rotator 605. The information indicative of the listeners head orientation 303-1 can be in the form of a derived rotation matrix R(n). The spatial metadata rotator 605 can be configured to rotate the spatial metadata 411 to account for the listeners head orientation.

To rotate the spatial metadata 411 the direction parameter(s) of the spatial metadata 411 are converted to a vector form. For example, if the direction parameter is composed of an azimuth θ(k, n) and elevation φ(k,n), where k is the frequency band index, it can be converted by $$v_{DOA}(k,n) = \begin{bmatrix} \cos(\theta(k,n))\cos(\varphi(k,n)) \\ \sin(\theta(k,n))\cos(\varphi(k,n)) \\ \sin(\varphi(k,n)) \end{bmatrix}$$

Then, the vector is rotated by $$v_{DOA,R}(k,n) = \begin{bmatrix} v_x(k,n) \\ v_y(k,n) \\ v_z(k,n) \end{bmatrix} = R(n)v_{DOA}(k,n)$$

Then, the rotated spatial metadata direction is determined by $$\theta_R(k,n) = \text{atan2}(v_y(k,n), v_x(k,n))$$

$$\varphi_R(k,n) = \text{atan2}\left(v_z(k,n), \sqrt{(v_x(k,n))^2 + (v_y(k,n))^2}\right)$$

The spatial metadata rotator 605 provides rotated spatial metadata 607 as an output. The rotated spatial metadata 607 is similar to the original spatial metadata 411, but in the rotated spatial metadata 607 the rotated direction parameters $\theta_R$(k, n) and $\varphi_R$(k, n) replace the original direction parameters θ(k, n) and φ(k,n). In practice, this rotation compensates for the head rotation by rotating the direction parameters to the opposite direction. The ratio parameter r(k, n) can be forwarded without any modification. Other potentially available parameters can be suitably modified or forwarded without modifications.

The spatial synthesiser is configured so that the rotated spatial metadata 607 and the time-frequency transport signals 603 are provided as inputs to the input and target covariance matrix determiner 609. The input and target covariance matrix determiner 609 is configured to determine the covariance matrices. The covariance matrices comprise an input covariance matrix that representing the time-frequency transport signals 603 and a target covariance matrix representing the time-frequency binaural audio signals 619. The time-frequency binaural audio signals 619 are the signals that are to be rendered.

The input covariance matrix can be measured from the time-frequency transport signals $S_t$(b, n) by $$C_x(k,n) = \sum_{b=b_{low}(k)}^{b_{(high)}(k)} S_t(b,n)S_t^H(b,n)$$

where the superscript H indicates a conjugate transpose.

In this example an STFT was used by the forward filterbank 601. The temporal resolution is relatively low, and only averaging along frequency axis is utilized for determining the input covariance matrix.

In some examples, the applied filter bank the is used might not be an STFT, but could be something else such as a complex QMF filterbank, or a low-delay variant of a QMF filterbank. In such cases the temporal resolution is finer, but the frequency resolution is coarser. In those cases, it might be that the averaging takes place along the time axis. In some examples, the averaging that results in the covariance matrix estimates can take place along both time and frequency axes.

The target covariance matrix can be determined based on the rotated spatial metadata 607 and the overall signal energy. The overall signal energy $E_o(k, n)$ can be obtained as the mean of the diagonal values of $C_x(k,n)$. Then, in one example, the rotated spatial metadata 607 consists of the rotated direction parameters $\theta_R(k, n)$ and $\varphi_R(k, n)$ and a direct-to-total ratio parameter r(k, n). The target covariance matrix is $$C_y(k, n) = E_o(k, n)r(k, n)h(k, \theta_R(k, n), \varphi_R(k, n))h^H(k, \theta_R(k, n), \varphi_R(k, n)) + E_o(k, n)\ (1 - r(k, n))C_d(k)$$

where $h(k, \theta_R(k, n), \varphi_R(k, n))$ is a head-related transfer function (HRTF) column vector for band k, azimuth $\theta_R(k, n)$ and elevation $\varphi_R(k, n)$. The head-related transfer function column vector is a column vector of length two with complex values, where the values correspond to the HRTF amplitude and phase for left and right ears. In high frequencies, the HRTF values can be real because phase differences are not needed for perceptual reasons at high frequencies. A HRTF pair for band k could be one that corresponds to the center frequency of band k. The HRTFs for a given direction and frequency can be obtained using any suitable process. $C_d(k)$ is the diffuse field binaural covariance matrix, which can be determined in an offline stage by taking a spatially uniform set of HRTFs, formulating their covariance matrices independently, and averaging the result.

The input covariance matrix $C_x(k, n)$ and the target covariance matrix $C_y(k, n)$ are output as covariance matrices 611 by the input and target covariance matrix determiner 609.

The above example considered only directions and ratios. Other parameters could be used to determine the covariance matrices 611 instead of, or in addition to directions and ratios. For example, spatial coherence parameters could be used. Also, different types of spatial audio output could be provided in some examples and so the spatial audio output need not be a binaural output and this could be accounted for when determining the covariance matrices 611.

The covariance matrices 611 $C_x(k, n)$ and $C_y(k, n)$ are provided as an input to a processing matrices determiner 613. The processing matrices determiner 613 is configured to user the covariance matrices 611 $C_x(k,n)$ and $C_y(k,n)$ to determine a processing matrix 615. The processing matrix 615 can be denoted M(k, n). The processing matrix 615 can be used for mixing or processing the time-frequency transport signals 603.

The processing matrix 615 can be determined using any suitable process. The process for determining the processing matrix 615 can be configured such that the output audio signals attain a determined target covariance matrix $C_y(k, n)$.

In some examples the processing matrices 615 can be determined by using a prototype matrix. The prototype matrix is a matrix that indicates to an optimization procedure which kind of mix of signals are meant for each of the outputs. One or more constraints can be applied. The constraints could be that the output must attain the target covariance matrix or could be any other suitable constraint. In some examples, the generation of favourable transport audio signals can be accounted for in the processing performed by the server 103. In such examples a simple prototype matrix can be used such as $$\begin{bmatrix} 1 & 0 \\ 0 & 1 \end{bmatrix}, \text{ or } \begin{bmatrix} 1 & 0.05 \\ 0.05 & 1 \end{bmatrix}.$$

The processing matrices determiner 613 then provides the processing matrices 615 M(k,n) as an output.

In some examples the processing matrices determiner 613 also determines a residual processing matrix $M_r(k,n)$. The residual processing matrix $M_r(k, n)$ can be needed when there is not enough independent signal energy in the transport audio signals 409 to generate the spatial audio output. For example, if there were two transport audio signals 409, and the spatial audio output comprises five substantially incoherent channels of a 5.1 loudspeaker configuration. However, in the example of FIG. 6, the spatial audio output is a binaural audio signal and the input transport audio signals 409 already comprises two signals with the required mutual incoherence because the left transport audio signal predominantly comprises the left signals for the listeners head orientation and the right transport audio signals predominantly contains the right signals for the listeners head orientation. Therefore, in this case the addition of decorrelated signal energy is not needed to generate the spatial properties for the two binaural output signals.

The time-frequency transport signals 603 $S_t(b, n)$ and the processing matrices 615 M(k, n) are provided as inputs to the mix module 617. The mix module 617 uses the processing matrices 615 to process the time-frequency transport signals 603 $S_t(b,n)$ to provide time-frequency binaural audio signals 619. The time-frequency binaural audio signals 619 can be denoted as $S_b(b, n)$ where:

$$S_b(b, n) = M(k, n)S_t(b, n)$$

where band k is the one where bin b resides. In this case decorrelation was not needed. In other examples decorrelation might be needed. In such cases there would be a need for further independent signal energy. In such cases decorrelated energy can be mixed in to replace the needed but missing independent signal energy.

The time-frequency binaural audio signals 619 are output from the mix module 617 to the inverse filter bank 621. The inverse filter bank 621 is configured to transform the time-frequency binaural audio signals from a time-frequency representation to a time representation. The inverse filter bank 621 is configured to apply an inverse transform corresponding to the transform applied by the forward filter bank 601. In this example the inverse filter bank 621 will apply an inverse STFT.

The time-frequency binaural audio signals 315 are provided as the output of the spatial synthesiser 503.

In the examples described the information indicative of the listeners head orientation 303 or location is transmitted from the listener device 105 to the server 103. The server 103 then uses the information indicative of the listeners head orientation 303 to generate the transport audio signals 409 that align with the listeners head orientation 303 or location. These transport audio signals 409 are then provided along with associated spatial metadata 411 from the server 103 to the listener device 105. These can be provided in a parametric spatial audio signal 313. The listener device 105 can then perform the spatial audio rendering based on parametric spatial audio signal 313 and a further, or more up to date, information indicative of the listeners head orientation 303-1 or location.

Examples of the disclosure enable the server 103 to use the information indicative of the listener's head orientation 303 to align or approximately align the parametric spatial audio signal with the listener's head orientation and/or the location of the listener. This can make it easier for the listener device 105 to render the spatial audio for playback to the listener.

The listener device 105 can use more up to date information indicative of the listener's head orientation 303-1 to perform the spatial rendering. The more up to date information indicative of the listener's head orientation 303-1 can be used because there are latencies between the server 103 and the listener device 105 so that there is unlikely to be an exact alignment between the listeners current head orientation and the head orientation as provided to the server 103. However, the inexact alignment will still result in the respective parametric audio signals comprising substantially the correct sounds with only small mismatches that would not have a significant effect on the perceived result. For instance, in the examples described above the transport audio signals 409 comprise a right signal and a left signal. In these cases the left transport audio signal would contain most of the left sounds and the right transport audio signal would contain most of the right sounds. In implementations that do not use examples of the disclosure there would be a large misalignment.

Figure 7:
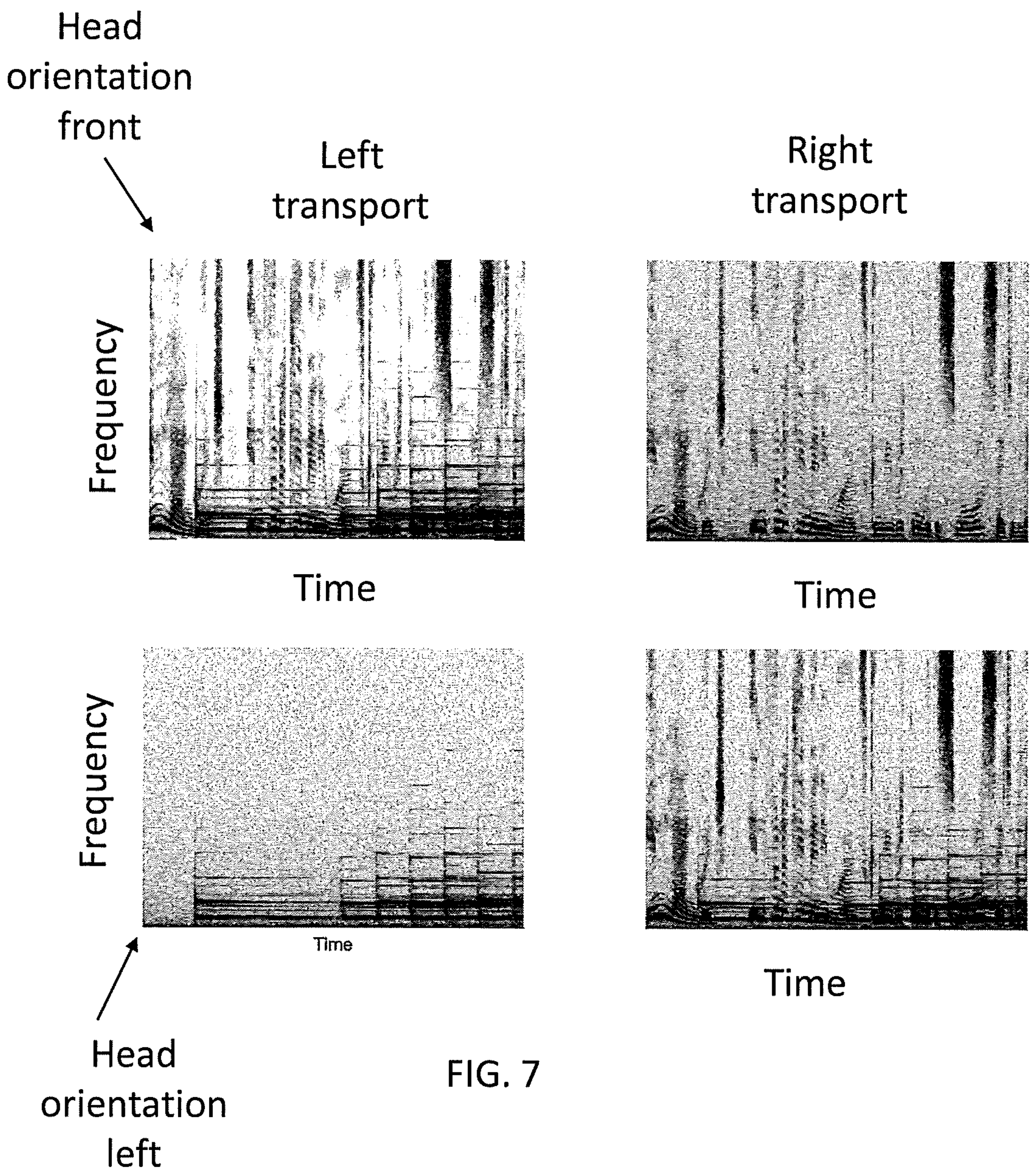
FIG. 7 shows results obtained using examples of the disclosure.

FIG. 7 shows results obtained using examples of the disclosure. FIG. 7 shows spectrograms of stereo transport audio signals 409 that have been generated using examples of the disclosure. The transport audio signals 409 can be generated by a server 103 and provided from the server 103 to a listener device 105. The transport audio signals 409 can comprise processed audio signals that are generated by processing input audio signals using information indicative of the listeners head orientation 303 or location that is received from the listener device 105.

The results shown in FIG. 7 were obtained using source input audio signals comprising speech, piano, and noise. In this case the speech sound is located to the front, the piano sound is located to the left and the noise is located to the right. These mixed audio signals were used for illustration purposes. In practical implementations different types of sounds could be used. For instance, if the system 101 is being used for teleconferencing the audio input signals would mainly comprise speech and the sources or angle of arrival could be in any direction.

The top row of FIG. 7 shows the results obtained when the head orientation of the listener was determined to be towards the front. The left hand side shows the left transport audio signal and the right hand side shows the right transport audio signal. In this case the listener was facing towards the speech sound, the piano is located to the listeners left and the noise is located to the listeners right. The server 103 therefore generates the transport audio signals so that the speech is panned to the centre, the piano is panned to the left transport channel and the noise is panned to the right transport channel. This is suitable for binaural rendering, because the transport audio signals contain sounds that are already appropriately aligned in the left-right axis.

The bottom row of FIG. 7 shows the results obtained when the head orientation of the listener was determined to be towards the left. In this case the listener has rotated their head 90 degrees anti-clockwise from the orientation of the top row. In this orientation the transport audio signals as shown in the top row are no longer suitable for binaural rendering. In this case the misaligned transport audio signals 409 could cause artifacts in the spatial rendering. The spatial metadata 411 generated by the server 103 and provided in the parametric spatial audio signals 313 only provides information on how the sound energy is distributed in space. If the starting point for rendering of the transport audio signals 409 is misaligned, the fine spectral content is consequently distributed at wrong directions. This would be noticeable to a listener as spatially unstable or unprecise sources.

In the bottom row in FIG. 7 the server 103 has received information indicating that the listener is facing to the left. This is information is used when processing the input audio signals. In this case listener is now facing towards the piano, the speech sound is located to the listener's right and the noise is located behind the listener. The server 103 therefore generates the transport audio signals so that the speech is now panned to the right and the piano and the noise are panned to the centre.

The server 103 therefore provides processed audio signals so that they are aligned with the head orientation of the listener. This provides significant quality improvements by avoiding the quality degradations caused by spectral content being distributed at wrong directions.

In the illustrative example of FIG. 7 there were three sound sources in the input audio signal. In implementations of the disclosure there could be any number of audio sources and the audio sources need not be point sources, they could be spatial or wide audio sources.

In some cases the audio signals 311 can be associated with accompanying videos. Coding such as viewport adaptive video coding can be used to optimize bitrate for 360-degree videos when the video is displayed on head-mounted displays (HMDs) or other suitable devices. The field-of-view that is presented on the HMD is only part of the full 360 degrees, the encoder can be configured to encode the video at high bit rate for the viewport direction but apply lower bitrate to encode other directions. The adaptivity is achieved by having a feedback channel from the HMD to the video encoder and using this feedback channel to provide current viewport direction information to the video encoder. The viewport direction information could comprise information indicative of the listeners head orientation 303. Real-Time Transport Protocol (RTCP) feedback messages can be used to signal viewport information to the video encoder. In some examples, the implementations of the disclosure can be used with viewport adaptive video, so it may be possible to provide the viewport direction value received by the video encoder to the audio server 103. In such cases the need for a separate feedback channel for the audio stream can be omitted.

The servers 103 used in examples of the disclosure can be media servers that are configured to read (object) audio (and video) from a file and render the audio read from the file for the listener. In some examples the server 103 could comprise any device configured to performing the generation of the transport audio signal 409 according to the information indicative of the listeners head orientation 303 received from the listener device 105.

In some examples the audio objects can also include elevations. In such cases, any formula in the above examples that converted object azimuth to a unit vector can be replaced with a formula that converts azimuth and elevation to a corresponding unit vector.

In some examples, the processing of the input audio signals 311 using the information indicative of the listeners head orientation 303 can be enabled or disabled based on some criteria. The criteria could be a delay in the passing of the information indicative of the listeners head orientation 303 from the listener device 105 to the server 103 or any other suitable criteria. For instance, if a delay in the passing of the information indicative of the listeners head orientation 303 is above a threshold the processing of the input audio signals 311 using the information indicative of the listeners head orientation 303 can be disabled and replaced with an alternative processing. The alternative processing could be to mix the input audio signals 311 using a default orientation. The default orientation could be the listener facing forward or any other suitable orientation. Correspondingly, if the delay is smaller than the threshold, the processing of the input audio signals 311 using the information indicative of the listeners head orientation 303 can be enabled. Enabling and disabling the mixing the processing of the input audio signals 311 using the information indicative of the listeners head orientation 303 can also be performed based on some criteria, such as the reliability of the information indicative of the listeners head orientation 303 that is received by the server 103.

In the above examples the listener device 105 renders binaural audio signals 315 from the received parametric spatial audio signals 313. The listener device 105 could be configured to render other types of spatial audio in other examples. For example, if the situation was that instead of tracking the head orientation of the listener the orientation of an avatar in a virtual world is tracked, then the listener device 105 can be configured so that the parametric spatial audio signal 313 can be rendered to and reproduced by a surround loudspeaker setup, such as 5.1 or 7.1+4 setup. In such cases the rendering output can also be regular stereo output, or stereo- or multi-channel output providing binaural sound using cross-talk-cancel techniques. Similarly, the rendering output could be an Ambisonic output for an external Ambisonic-to-binaural renderer. The rendering of a stereo, cross-talk-cancel stereo, surround loudspeaker or Ambisonic output from transport audio signals and spatial metadata can be implemented using any suitable techniques.

FIG. 8 schematically shows an example apparatus 801 that could be used in some examples of the disclosure. In the example of FIG. 8 the apparatus 801 comprises at least one processor 803 and at least one memory 805. It is to be appreciated that the apparatus 801 could comprise additional components that are not shown in FIG. 8.

The apparatus 801 can be configured to implement examples of the disclosure. The apparatus 801 can be configured to process input audio signals. The apparatus 801 can be a controller apparatus that can be configured to control functions of a device comprising the apparatus 801.

In the example of FIG. 8 the implementation of the apparatus 801 can be implemented as processing circuitry. In some examples the apparatus 801 can be implemented in hardware alone, have certain aspects in software including firmware alone or can be a combination of hardware and software (including firmware).

As illustrated in FIG. 8 the apparatus 801 can be implemented using instructions that enable hardware functionality, for example, by using executable instructions of a computer program 807 in a general-purpose or special-purpose processor 803 that can be stored on a computer readable storage medium (disk, memory etc.) to be executed by such a processor 803.

The processor 803 is configured to read from and write to the memory 805. The processor 803 can also comprise an output interface via which data and/or commands are output by the processor 803 and an input interface via which data and/or commands are input to the processor 803.

The memory 805 is configured to store a computer program 807 comprising computer program instructions (computer program code 809) that controls the operation of the apparatus 801 when loaded into the processor 803. The computer program instructions, of the computer program 807, provide the logic and routines that enables the apparatus 801 to perform the methods illustrated in FIGS. 3 to 8. The processor 803 by reading the memory 805 is able to load and execute the computer program 807.

The apparatus 801 therefore comprises: at least one processor 803; and at least one memory 805 including computer program code 809, the at least one memory 805 storing instructions that, when executed by the at least one processor 803, cause the apparatus 801 at least to:

receiving 201 information indicative of a first orientation and/or location of a listener;

obtaining 203 one or more input audio signals;

processing 205 the one or more input audio signals using at least the information indicative of the first orientation and/or location of the listener to generate one or more processed audio signals;

generating 207 spatial metadata based at least on the one or more input audio signals; and enabling transmission 209 of the one or more processed audio signals and the spatial metadata, wherein the transmitted signals and the spatial metadata are configured to enable rendering of a spatial audio output based on the processed audio signals and the spatial metadata and information indicative of a second orientation and/or location of the listener.

As illustrated in FIG. 8 the computer program 807 can arrive at the apparatus 801 via any suitable delivery mechanism 811. The delivery mechanism 811 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 807. The delivery mechanism can be a signal configured to reliably transfer the computer program 807. The apparatus 801 can propagate or transmit the computer program 807 as a computer data signal. In some examples the computer program 807 can be transmitted to the apparatus 801 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 807 comprises computer program instructions for causing an apparatus 807 to perform at least the following:

receiving 201 information indicative of a first orientation and/or location of a listener;

obtaining 203 one or more input audio signals;

processing 205 the one or more input audio signals using at least the information indicative of the first orientation and/or location of the listener to generate one or more processed audio signals;

generating 207 spatial metadata based at least on the one or more input audio signals; and enabling transmission 209 of the one or more processed audio signals and the spatial metadata, wherein the transmitted signals and the spatial metadata are configured to enable rendering of a spatial audio output based on the processed audio signals and the spatial metadata and information indicative of a second orientation and/or location of the listener.

The computer program instructions can be comprised in a computer program 807, a non-transitory computer readable medium, a computer program product, a machine readable medium. In some but not necessarily all examples, the computer program instructions can be distributed over more than one computer program 807.

Although the memory 805 is illustrated as a single component/circuitry it can be implemented as one or more separate components/circuitry some or all of which can be integrated/removable and/or can provide permanent/semi-permanent/dynamic/cached storage.

Although the processor 803 is illustrated as a single component/circuitry it can be implemented as one or more separate components/circuitry some or all of which can be integrated/removable. The processor 803 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. can represent steps in a method and/or sections of code in the computer program 807. The illustration of a particular order to the blocks does not necessarily imply that there is a required or preferred order for the blocks and the order and arrangement of the block can be varied. Furthermore, it can be possible for some blocks to be omitted.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising:

at least one processor; and at least one memory storing instructions that, when executed with the at least one processor, cause the apparatus at least to:

receive information indicative of at least one of a first orientation or location of a listener;

obtain one or more input audio signals;

process the one or more input audio signals using at least the information indicative of at least one of the first orientation or location of the listener to generate one or more processed audio signals;

generate spatial metadata based at least on the one or more input audio signals; and enable transmission of the one or more processed audio signals and the spatial metadata, wherein the transmitted signals and the spatial metadata are configured to enable rendering of a spatial audio output based on the processed audio signals and the spatial metadata and information indicative of at least one of a second orientation or location of the listener.

2. The apparatus as claimed in claim 1, wherein the instructions, when executed with the at least one processor, cause the apparatus to mix the input audio signals as a function of at least one of: an angular orientation; or position information associated with the one or more input audio signals.

3. The apparatus as claimed in claim 1, wherein instructions, when executed with the at least one processor, cause the apparatus to rotate position information of one or more input audio signals based on the information indicative of at least one of the first orientation or location of the listener.

4. The apparatus as claimed in claim 1, wherein the instructions, when executed with the at least one processor, cause the apparatus to enable transmission of an indication that the one or more processed audio signals have been processed using the information indicative of at least one of the first orientation or location of a listener.

5. The apparatus as claimed in claim 1, wherein the information indicative of at least one of the first orientation or location of the listener is at least one of:

received from a device configured to determine at least one of the orientation or location of the listener;

received in response to at least one of the orientation or location of the listener changing from a first zone to a second zone;

received at regular intervals and location of the listener having changed from a first zone to a second zone; or is not used to generate the spatial metadata.

6. The apparatus as claimed in claim 1, wherein the instructions, when executed with the at least one processor, cause the apparatus to at least one of:

determine one or more criteria of the information indicative of at least one of the first orientation or location of the listener; or enable the processing of the one or more audio input signals using the information indicative of at least one of the first orientation or location of the listener based on the one or more criteria.

7. The apparatus as claimed in claim 1, wherein the instructions, when executed with the at least one processor, cause the apparatus to perform a rotation of the generated spatial metadata.

8. The apparatus as claimed in claim 1, wherein the one or more audio input signals comprises at least one of: mono audio signals; stereo audio signals; multi-channel surround audio signals; ambisonic audio signals; or parametric spatial audio signals.

9. The apparatus as claimed in claim 1, wherein at least one of the orientation or location of the listener corresponds to at least one of:

at least one of a real-world orientation or location of the listener; or at least one of a virtual orientation or location of the listener.

10. The apparatus as claimed in claim 1, wherein the instructions, when executed with the at least one processor, cause the apparatus to enable transmission of the one or more processed audio signals and the spatial metadata to an audio playback device.

11. A method, comprising:

receiving information indicative of at least one of a first orientation or location of a listener;

obtaining one or more input audio signals;

processing the one or more input audio signals using at least the information indicative of at least one of the first orientation or location of the listener to generate one or more processed audio signals;

generating spatial metadata based at least on the one or more input audio signals; and enabling transmission of the one or more processed audio signals and the spatial metadata, wherein the transmitted signals and the spatial metadata are configured to enable rendering of a spatial audio output based on the processed audio signals and the spatial metadata and information indicative of at least one of a second orientation or location of the listener.

12. The method as claimed in claim 11, wherein processing the one or more input audio signals using at least the information indicative of at least one of the first orientation or location of the listener comprises at least one of:

mixing the input audio signals as a function of at least one of: an angular orientation; or position information associated with the one or more input audio signals; or rotating position information of one or more input audio signals based on the information indicative of at least one of the first orientation or location of the listener.

13. The method as claimed in claim 11, further comprising enabling transmission of an indication that the one or more processed audio signals have been processed using the information indicative of at least one of the first orientation or location of a listener.

14. The method as claimed in claim 11, wherein the information indicative of at least one of the first orientation or location of the listener is at least one of:

received from a device configured to determine at least one of the orientation or location of the listener;

received in response to at least one of the orientation or location of the listener changing from a first zone to a second zone;

received at regular intervals, and the method further comprises determining if at least one of the orientation or location of the listener has changed from a first zone to a second zone; or not used to generate the spatial metadata.

15. The method as claimed in claim 11, further comprising determining one or more criteria of the information indicative of at least one of the first orientation or location of a listener and enabling the processing the one or more audio input signals using the information indicative of at least one of the first orientation or location of the listener based on the one or more criteria.

16. The method as claimed in claim 11, further comprising performing a rotation of the generated spatial metadata.

17. The method as claimed in claim 11, wherein the one or more audio input signals comprises at least one of: mono audio signals; stereo audio signals; multi-channel surround audio signals; ambisonic audio signals; or parametric spatial audio signals.

18. The method as claimed in claim 11, wherein at least one of the orientation or location of the listener corresponds to at least one of: at least one of a real-world orientation or location of the listener; or at least one of a virtual orientation or location of the listener.

19. The method as claimed in claim 11, wherein the apparatus is configured to enable transmission of the one or more processed audio signals and the spatial metadata to an audio playback device.

20. A non-transitory program storage device readable with an apparatus, tangibly embodying a program of instructions executable with the apparatus to cause the apparatus to perform:

receiving information indicative of at least one of a first orientation and/or or location of a listener;

obtaining one or more input audio signals;

processing the one or more input audio signals using at least the information indicative of at least one of the first orientation or location of the listener to generate one or more processed audio signals;

generating spatial metadata based at least on the one or more input audio signals; and enabling transmission of the one or more processed audio signals and the spatial metadata, wherein the transmitted signals and the spatial metadata are configured to enable rendering of a spatial audio output based on the processed audio signals, the spatial metadata, and information indicative of at least one of a second orientation or location of the listener.

* * * * *